SELECTIVE ENCODING TECHNIQUE FOR BANDWIDTH REDUCTION IN GRAPHIC COMMUNICATION SYSTEMS

Filed June 10, 1966 4 Sheets-Sheet 1

INVENTOR.
PAUL H. DE GROAT
BY Anthony D. Cennamo
Paul W. Fish
ATTORNEYS

Dec. 9, 1969 P. H. DE GROAT 3,483,317

SELECTIVE ENCODING TECHNIQUE FOR BANDWIDTH REDUCTION IN GRAPHIC COMMUNICATION SYSTEMS

Filed June 10, 1966 4 Sheets-Sheet 2

INVENTOR.
PAUL H. DE GROAT

BY

ATTORNEYS

INVENTOR.
PAUL H. DE GROAT
BY Anthony D. Cennamo
Paul W. Fish
ATTORNEYS

INVENTOR.
PAUL H. DE GROAT
BY Anthony D Cennamo
Paul W. Fish
ATTORNEYS

United States Patent Office 3,483,317

Patented Dec. 9, 1969

3,483,317

SELECTIVE ENCODING TECHNIQUE FOR BAND-WIDTH REDUCTION IN GRAPHIC COMMUNICATION SYSTEMS

Paul H. De Groat, Webster, N.Y., assignor to Xerox Corporation, Rochester, N.Y., a corporation of New York Filed June 10, 1966, Ser. No. 556,698
Int. Cl. H04n 7/12
U.S. Cl. 178—6 10 Claims

ABSTRACT OF THE DISCLOSURE

A selective encoding technique wherein a binary data waveform is divided into segments according to the expected information content on a document or in a computer output waveform and analyzed for the existence of data information. The segments determined with all redundant background information are encoded by a run length technique, characterized and transmitted. Those segments determined with data information therein are transmitted in entirety after characterization.

This invention relates to graphic communication systems and, more particularly, to methods and apparatus for reducing the bandwidth required for the transmission of binary information signals.

As is known in a normal facsimile system, a document to be transmitted is scanned at a transmitting station to convert information on the document into a series of electrical signals. These video signals, or carrier modulated signals corresponding thereto, are then coupled to the input of a communication link interconnecting the transmitter with the receiver. At a receiving station, the video signals, in conjunction with suitable synchronizing signals, selectively control the actuation of appropriate marking means to generate a facsimile of the document transmitted.

A principal application of facsimile equipment is the transmission of printed or typewritten documents and letters. It is a distinguishing characteristic of such original documents that printing or typing is arranged in substantially horizontal lines. Examination of a typical letter, for example, will show that lines of typing actually occupy considerably less than half the vertical dimension of the letter, the rest of its dimension being blank and corresponding to spaces between lines as well as blank spaces at the top and bottom of the letter. In a conventional facsimile system, all parts of such a letter are normally scanned at a uniform rate. Assuming transmission over an ordinary telephone line, it may take in the order of six to fifteen minutes to transmit an ordinary letter with reasonable resolution. Considering the cost of the telephone service, such a long transmission time becomes a serious limitation on the economic usefulness of facsimile equipment.

In addition, it is often desirable that the output binary information from an electronic computer or other digital output device be transmitted to one or more of a number of remote locations for output printing, or for permanent or temporary storage and subsequent readout. A transmission network similar to that used in a facsimile system would then be necessary for the transfer of information from the computer or the like to such a remote printer.

The signal redundancy inherent in computer or facsimile output waveforms, due, for example, to the fact that the waveform comprises two-level binary information and the attendant long periods of little or no information transmission, have led to the development of various encoding techniques to reduce such redundancy, thereby eliminating the wasted transmission time. One such encoding technique is known as run length encoding in which binary numbers corresponding to various blocks of binary data are transmitted rather than the usual binary signals. In such a system, a binary number of relatively few bits may be sent in lieu of a larger block of video data.

Such encoding techniques, while significantly reducing the number of binary digits or bits which must be sent and thereby reducing the transmission time, have not been entirely satisfactory. In a normal facsimile system, for example, the information is, in general, not uniformly spread over the document surface; thus, the rate at which the scanner presents information to the transmission channel varies with time and sometimes a complete scan line may consist of a single information bit, black or white. In a computer system, long period of redundant information may be transmitted between information words which would not fully lend itself to prior art encoding techniques. For this reason, conventional binary transmission systems with known encoding techniques do not fully utilize the capacities of the transmission channels, and thus the high cost thereof remains prohibitively high.

It is, accordingly, an object of the present invention to provide methods and apparatus for efficiently utilizing the bandwidth capabilities of graphic communication and transmission systems.

It is another object of the present invention to optimize the information handling capability of transmission networks in graphic communication systems.

It is another object of the present invention to reduce the operating costs of transmitting binary data information waveforms that include long periods of redundant information.

It is still another object of the present invention to decrease the bandwidth requirement for binary information transmission.

In accomplishing the above and other desired aspects, applicant has invented novel methods and appratus for reducing the redundant information in transmitted digital waveforms. There is disclosed a novel selective encoding technique wherein a binary data waveform is divided into segments according to the expected informational content on a document or in a computer output waveform and analyzed for the existence of data information. The segments determined with all redundant background information are encoded by a run length technique and charatcerized. Those segments determined with data information are transmitted in entirety after characterization.

In the encoding process, successive like segments of binary information digits are inspected in sequence and a counter is advanced for each successive segment determined to contain all redundant background binary information. A characterizing control digit is placed on the count word upon transmission. For the segments determined to contain black or data information, a control binary digit of the other polarity is used to characterize this condition and the entire segment of digits is transmitted without being counted. Thus, successive groups of redundant information are reduced to a short count word, while the actual data representative information is transmitted in entirety.

In accordance with one aspect of the invention, the serial binary data waveform is sequentially stored and analyzed at an encoder for the presence of data representative information. In a second aspect of the invention, the image exploring beam from a facsimile scanner is interrupted upon the detection of black or data information. The deflection circuitry at the scanner is controlled to slow down the sweep of the scan beam so as to detect the data or black information within the segment of the line and transmit it at a rate compatible with the bandwidth capability of the transmission medium.

For a more complete understanding of the invention, as well as other objects and further features thereof, reference may be had to the following detailed description in conjunction with the drawings wherein.

Figure 1:
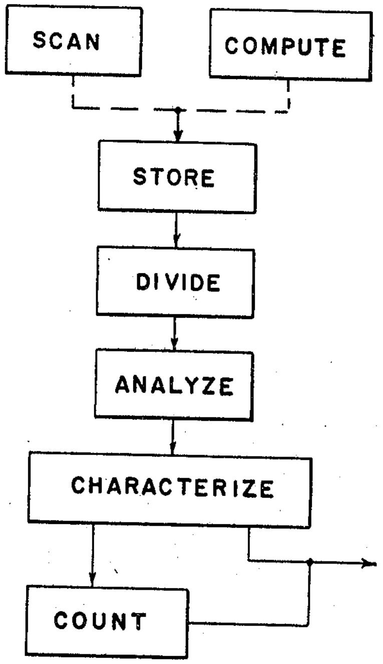
FIG. 1 is a flow diagram illustrating the encoding operation for transmission of data information from a facsimile transmitter or electronic computer according to a first aspect of the principles of the present invention.

Referring now to FIG. 1, there is shown a flow diagram of a first aspect of the present invention. Binary data information from a facsimile scanner, an electronic computer or the like, in a manner hereinafter more fully described, is serially stored for electronic division of the data information waveform into elements of a predetermined number of binary digits. Each element is then sequentially analyzed for the existence of printed or data information signals. If an element is found to consist of all white or redundant information, it is characterized by a binary characterizing tag and a counter is advanced by a single count. For each successive subsequent element which is found to consist of all background or redundant information, the counter is advanced by one count for each of such elements detected in a run length encoding adaptation. Such count signal is then transmitted along with the characterizing binary tag instead of the binary elements themselves. If an element is detected as having some black or data information signals, it is tagged with a different characterizing binary digit and the binary digits of the entire element are transmitted without being counted. Thus, the output wave train will consist of a count number of the successive groups of binary digits that are detected with all white or redundant information along with its characterizing digits and the binary words representing the actual binary information within an element along with its characterizing binary tag.

Figure 2:
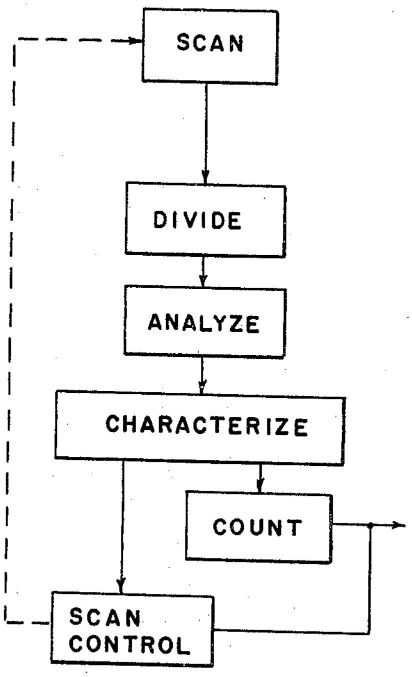
FIG. 2 is a flow diagram illustrating the encoding operation for transmission of data information from a facsimile transmitter according to a second aspect of the principles of the present invention.

In FIG. 2 is shown a flow diagram of the encoding operation in a second aspect of the present invention. In this embodiment, the scanning beam is controlled according to the information capacity of a scan line on a document. As the scan moves across the document, the output video information waveform is continuously analyzed for the presence of black or data information. When a segment is determined to contain some black information data, the segment is characterized as such and the scan beam is interrupted and caused to slow down for transmission of the detected data information. The information content of the segment is then transmitted in its entirety following the control digit characterizing the content of the binary segment. Scanning resumes for subsequent elements and the encoding operation continues of analyzing, characterizing and counting the successive groups of binary digits with all white or background information therein, or the transmitting of the actual binary digits comprising the segment when found to contain some black or data information. Any of the known control scan circuits and apparatus may be utilized together with an encoder and decoder whose operation is similar to those shown and described in FIGS. 5 and 6.

Figure 3:
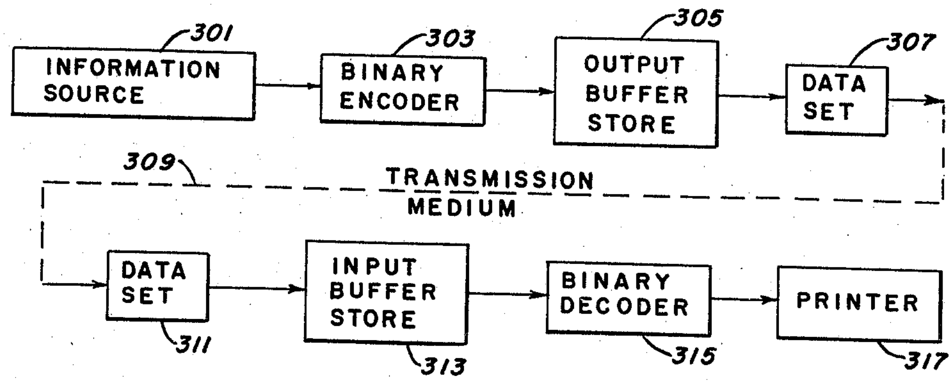
FIG. 3 is a block diagram of a data transmission system employing the principles of the present invention.

Referring now to FIG. 3, there is shown a graphic communication system utilizing the principles of the present invention. The transmitter portion of the system includes an information source 301 which could be a facsimile scanning device or an electronic computer output. A facsimile scanner in a normal manner, derives individual pulses corresponding to black and white picture elements or dots forming the pictorial material explored by the scanner. The scanner may be any of the mechanical or electronic devices well known in the art for translating the densities of elemental areas of typed or pictorial copy into signal waveforms. Electronic scanning, however, is generally preferred. The scanner may conveniently include a light source, such as a cathode ray tube, an optical system which delineates elemental areas of the subject copy, means for systematically moving one with respect to the other in two directions, and a light-sensitive detection device together with directly associated circuits. Included in a scanner are the normal facsimile circuits such as deflection, synchronizing and time-quantizing circuits, which convert the analog information signals to a digital output signal.

The information source 301 may also comprise an electronic computer of any known design. Such a computer would comprise the normal address, operation, and output circuits, together with digitizing and time-quantizing circuits to supply a binary digital output in the event that the computer is of the analog type. The computer utilized may have a serial or parallel information output such that the encoding and decoding devices, as hereinafter set forth, may effectively reduce the redundancy occurring in such output signals. The output from the information source 301 is coupled to a binary encoder 303, which is more fully hereinafter described in conjunction with FIG. 5

The output from the binary encoder 303 is coupled to the input of buffer store 305, in a manner to be hereinafter more fully described in conjunction with the encoder of FIG. 5. The output information is stored temporarily at the buffer store 305 before transmission to the receiver. The buffer store 305 may comprise a logical flip-flop circuit arrangement or a magnetic core matrix, for example. The encoded waveform is received from the binary encoder 303 by the buffer store 305 as the information is encoded. However, the information to be transmitted over the transmission medium is drawn from the buffer store at the rate which will approach the maximum rate compatible with the bandwidth capability of the medium itself.

At the input and output ends of the transmission medium 309 are circuits 307 and 311 for providing compatibility between the transmitter and receiver circuits and the transmission medium. These circuits commonly called data sets, provide impedance matching and power amplification and/or modulating apparatus. Such data sets may comprise line drivers or a frequency shift keyer. A clock source of known frequency may also be provided for transmission synchronization.

The transmitted digital information is received over the transmission line 309 from data set 307 at data set 311. The data set 311 transfers the information from the transmission mode to that compatible with operation in the receiver. Input buffer store 313, similar to the output buffer store 305, receives the information from the data set and is drawn upon by the binary decoder 315 as is necessary for the decoding operation. The binary decoder 315, in an operation more fully hereinafter described in conjunction with FIG. 6, reconstructs the signal waveform with its associated redundancy.

Coupled to the binary decoder 315 is the output printer 317. The printer 317 may comprise a flying spot scanner including a cathode ray tube similar to the type that may be employed in a facsimile transmitter as set forth in conjunction with information source 301. The electron beam of the cathode ray tube in the printer is selectively gated on in response to the received video signals, thus generating an information modulated source of light rays for selectively illuminating elemental portions of the light responsive, photoreceptor surface of a xerographic printer. For a complete understanding of a xerographic facsimile printer, for example, reference may be had to U.S. Patent 3,149,201, issued Sept. 15, 1964 to C. L. Huber et al. It is to be understood, however, that the xerographic facsimile printer is exemplary only and other types of printers known in the art may be employed in practicing the present invention.

Figure 4:
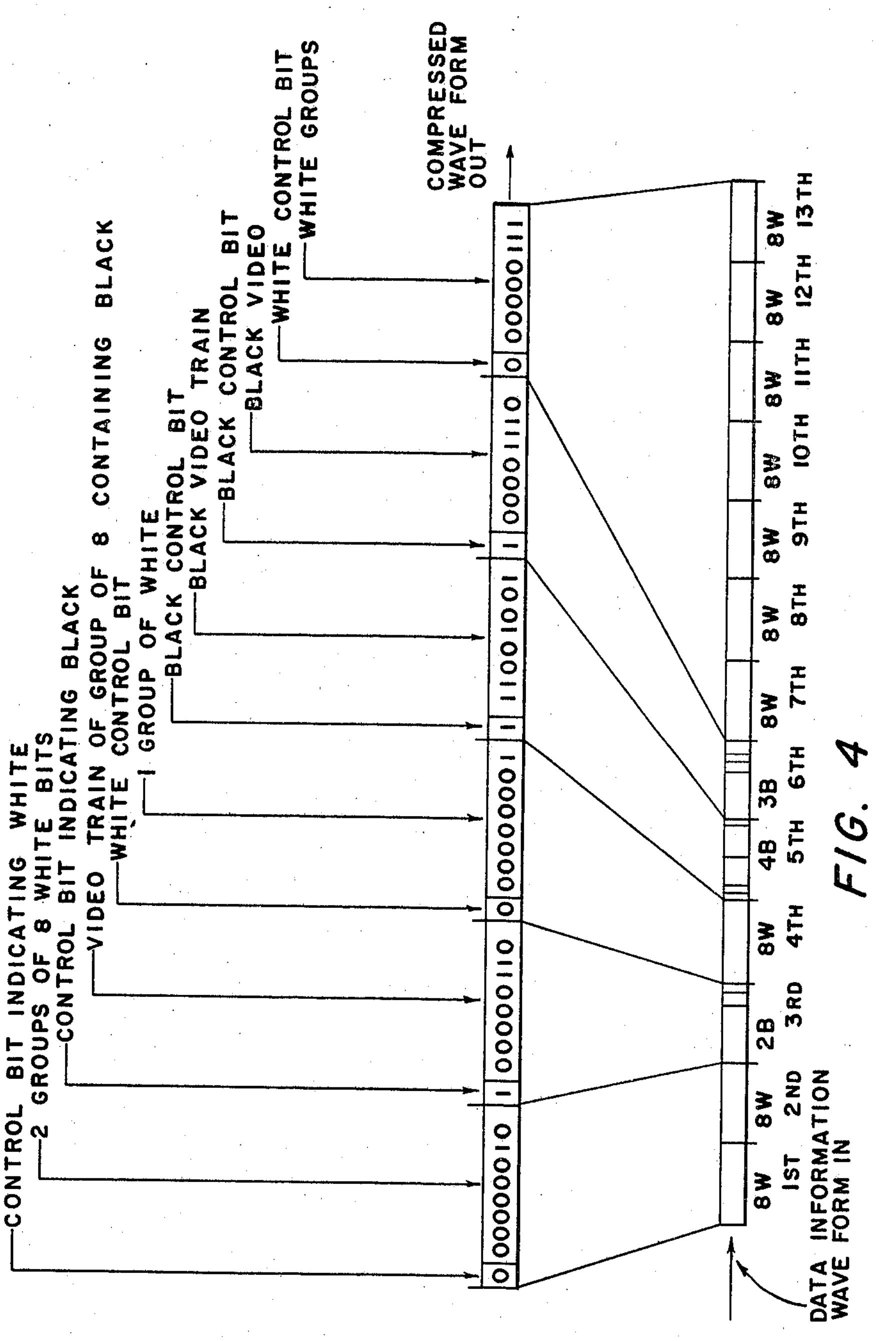
FIG. 4 is a representative diagram of part of a data information waveform useful in understanding the various aspects of the present invention.

FIG. 4 is a representative diagram of a data information waveform and its associated encoded waveform obtained by utilizing the principles of the present invention. The disclosed encoding technique reduces the number of binary digits necessary to represent a message in digital data form. The technique is most effective if the data is likely to consist of groups of a predetermined number of consecutive bits of the same level and when groups of one are in the majority. For purposes of definition, binery zero digit groups would be the most probably occurring and, in a facsimile scanner, would be considered as white or background information, while binary one digits would be considered as the existence of black or printed information. In the output from a computer the binary one digits would comprise the information while the binary zero digits would be the remaining background or redundant information.

The binary data stream from the information source is divided into M segments of N bits each by the encoder, as will hereinafter be more fully explained. M and N are integers with N being smaller than the longest group of consecutive binary zero digits that is likely to occur. If a segment of information is detected to be all binary zero digits, for example, a counter is advanced by a single count and a binary characterizing tag is attached to the count word. Thus, if the entire message consists of binary zero information, a binary count word representative of the number of detected segments along with such a binary characterizing tag is used to encode the segment. If data or black information is detected in a segment, a different characterizing binary tag is used to characterize this condition and the contents of the segment are transmitted in entirety without being counted. The compressed waveform would thus comprise alternate binary words with different binary characterizing tags, representing the successive groups of segments with all similar binary digits, followed by a segment or segments detected with binary one or data information successively.

Using FIG. 4 as an example, a data information waveform has been divided into thirteen segments of eight binary digits each. The figure is described for the information from a facsimile scanner but it is apparent that the same description could be used for the output from a computer or the like. Only part of a scan line has been illustrated to facilitate the explanation of the encoder operation. The first two eight-bit segments are seen to have all sixteen bit positions occupied by binary zero digits. The compressed waveform, therefore, for these first two eight-bit segments comprises an eight-bit count word indicating a binary count of two and the control bit indicating that all white information is found in those two segments. The third group of eight bits is seen to have binary one digits in the second and third bit positions and thus the compressed waveform representative thereof is the actual binary bit positions comprising the third group with a control bit of binary one indicating that black information exists in the eight bits in conjunction therewith.

The fourth group of eight bits is detected as having all binary zero or white information; therefore, the output waveform comprises a binary count word of one with a binary zero control bit indicative thereof. The fifth eight-bit segment is seen to have a binary one digit in the first, fourth, seventh, and eighth bit positions; therefore, the output waveform comprises the actual information placement along with a binary one digit as a control bit indicating binary one or black information to be found in the eight-bit positions in accordance therewith. The sixth binary group detected is seen to have a binary one digit in the second, third, and fourth bit positions; therefore, again, the output compressed waveform comprises the actual binary digits comprising the data information waveform plus a binary one control indicating the presence of black information therein. The next seven groups of eight binary digits are seen to comprise all binary zero or white information; therefore, the output compressed waveform is a binary count word indicating seven such groups of all binary zero digits along with a binary zero digit as a control bit representative thereof.

If, for example, an entire line was scanned and no black or binary one information was detected, the encoded signal, representing the groups in the entire line, would consist of eight digits comprising the count signal plus the control bit representative of the information in the count word. The digits may represent binary numbers, Gray scale representations or the like. Excluding the sync word, which may appear between data waveforms of the different scan lines so as to indicate to the receiver the beginning and end of a coded line, the maximum bandwidth compression of the line comprising one thousand binary digits would approach one hundred eleven to one. It is apparent, however, that other binary digit groupings could be utilized besides the count of eight depending upon the distribution of black and white information on a document to be scanned and transmitted or the information distribution in a data waveform from a computer or the like.

Figure 5:
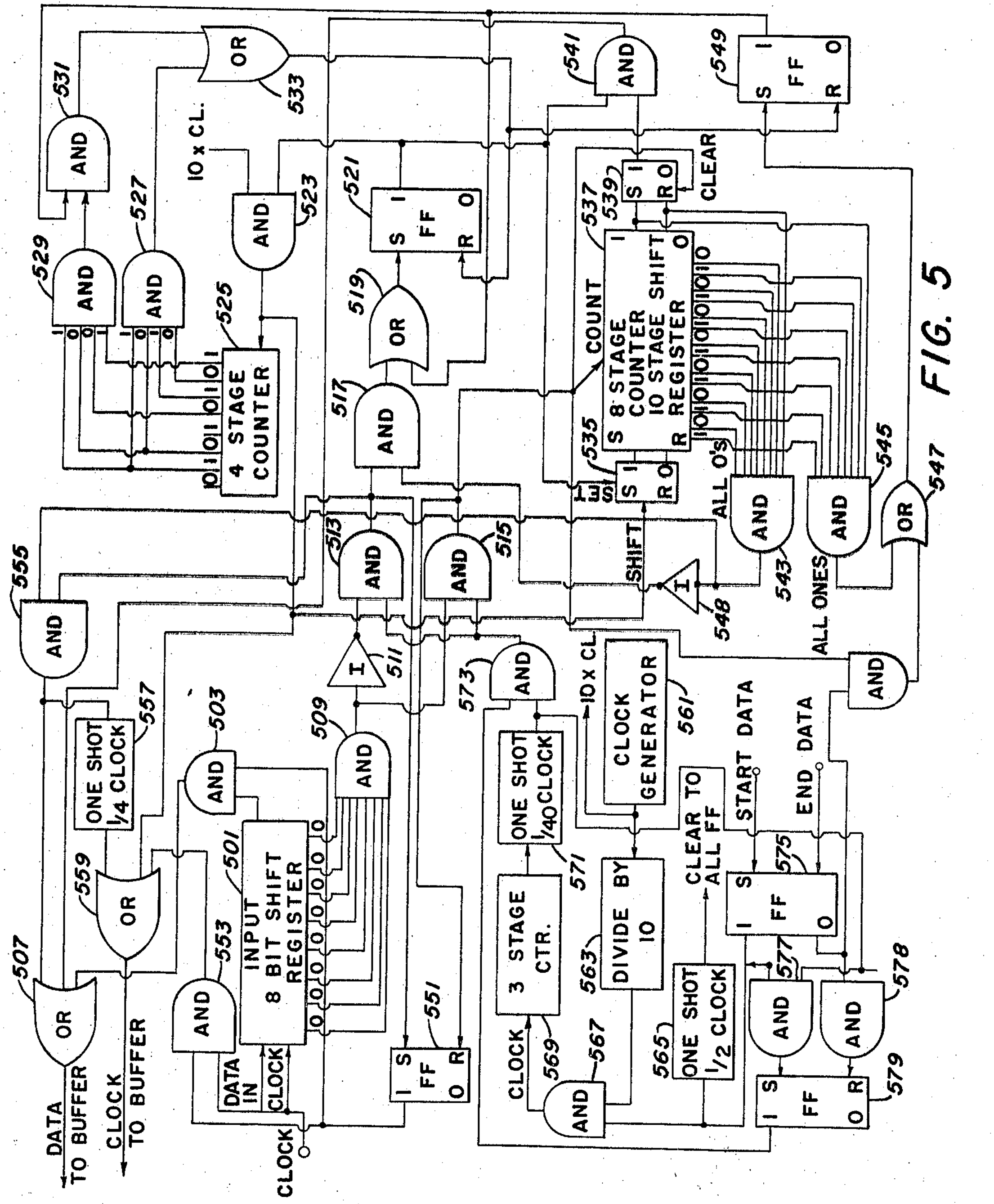
FIG. 5 is a detailed illustration of the selective binary encoder in accordance with the principles of the present invention.

FIG. 5 is a logic diagram of the binary encoder of the preferred embodiment, as shown in FIG. 3, utilizing the principles of the present invention. For purpose of example, the encoder will be described for examination of the data input waveform in groups of eight bits. Such a group division is merely exemplary as any division could be used according to the expected informational distribution of the waveform that would maximize the encoding process. The circuit is shown for the encoding of an endless waveform as from the output of a computer; however, the circuit could be modified to encompass the data waveform from a facsimile scanner as will be hereinafter set forth.

A start data signal at the input to flip-flop 575 energizes the circuit by resetting all the logic components to allow for operation on the incoming data information by a one-shot bistable network 565. Through AND gate 577 and flip-flop 579, AND gate 573 is enabled to allow the output from the three-stage counter 569 to pass at the proper count time. Clock generator 561 generates a clock pulse frequency which is ten times the rate at which the input data is fed into the encoder. The clock frequency at this rate is used for the internal operation of the encoder. A divide by ten network 563 is utilized to reduce the clock frequency to that at which the data input is fed to the input shift register 501. Such a clock frequency occurs at what is commonly termed the "bit time" as it is the time at which the separate information bits are shifted through the encoder. AND gate 567 passes the clock frequency to the three-stage counter 569 which counts to eight and emits a signal to the one-shot 571. The output from the one-shot 571 is a pulse of short duration of one-fortieth the clock frequency which appears at the input to AND gates 573, 577 and 578. The output from flip-flop 579 enables AND gate 573 and allows the one-shot output to appear on the output line of AND gate 573.

As the three-stage counter 569 begins counting, the information data is fed into the input shift register 501. When the input data information has been shifted through the shift register and all eight positions are occupied by such information, AND gate 509 will detect the presence of all binary zero digits within the input register 501. If the condition exists that all eight bit positions in register 501 are binary zero digits, that is, all are at the logic one level, AND gate 509 will be enabled and its output will be at the binary one level. With the inversion at inverter 511, AND gate 513 is disabled. AND gate 515, however, with both its inputs at the binary one level, is enabled and has at its output a binary one which advances the eight-stage counter-shift register 537 by one count. The three-stage counter 569 generates a pulse which, in effect, samples the contents of register 501 every eighth bit. Thus, for every consecutive eight bit group of all binary zero digits detected in input register 501, the eight-stage counter 537 will advance by one count, thereby counting the total number of such eight bit segments of information. The count pulse from the AND gate 515 also appears at the input of AND gate 581, hereinafter to be more fully explained, at the reset terminal of flip-flop 539, and the reset terminal of flip-flop 551. Flip-flop 551 is reset so as to prohibit any information from being shifted out of the shift register 501 as would be the case if any binary one digits were detected in such shift register, as will also be more fully described hereinafter. Flip-flop 539, which the count pulse from AND gate 515 clears, adds the control pulse to the output data train from counter 537 as the control pulse indicating white information. With flip-flops 535 and 539, therefore, counter-register 537 is a dual-function eight-stage counter and ten-stage shift register.

The eight-stage counter 537 has thus been counting the successive groups of eight bit segments containing all binary zero digits in the data input. When an eight bit segment of information is detected with at least one binary one digit within that segment, several operations occur. By the principles of the present invention, it is desired to shift out the entire segment in entirety with the proper control bit. Tracing through the sequence of events, it can be seen that with at least one binary one digit in a segment, AND gate 509 is disabled and will have at its output a binary zero level. With an inversion at inverter 511, AND gate 513 will now see a binary one level at one input. The other input is the output pulse generated by the three-stage counter 569 through gate 573. With AND gate 513 now enabled and AND gate 515 now disabled, the output of AND gate 513 will be at the binary one level. This binary one level appears as an input to AND gate 555, AND gate 517, and the set terminal of flip-flop 551. As the eight-stage counter 537 has been counting the consecutive groups containing all binary zero information, AND gate 543 will not detect an all zero condition in the counter 537. Thus, its output now at the binary zero level will be inverted as a binary one to the input of AND gate 517, and the binary zero level will appear as an input to AND gate 555, effectively disabling this gate. As AND gate 517 is now effectively enabled, a binary one level will appear on its output to OR gate 519. This signal will now set flip-flop 521. At the same time, the binary one level at the set output from flip-flop 521 will set flip-flop 535 and appear as an input to AND gates 523 and 541. As it is desired to shift out the count determined in counter 537 before the next information bit is shifted into input register 501, a ten times clock pulse is utilized at AND gate 523. With both inputs of AND gate 523 present at the binary one level, the output line of the gate will also appear as a binary one level. This signal is thus present also as the input to flip-flop 535 which begins to shift out the information stored in the counter 537 through enabled AND gate 541. At the same time, the ten times clock signal also appears at the input to OR gate 559 which is the clock shift pulse to the output storage buffer. Thus the count information passing through AND gate 541 and OR gate 507 will be shifted into the output buffer store by means of the clock shift signal provided through OR gate 559.

Along with the count of counter 537, indicating the number of consecutive groups containing all binary zero digit information, is a binary one digit caused by the setting of flip-flop 535 by the binary one level from flip-flop 521. This binary one digit is the control digit used to indicate that the next group of signals is a group of actual binary video digits as stored in the input register 501. This binary one digit is added to the end of the count word from counter 537 because, by definition, at the end of a sequence of segments detected with all binary zero digits, must be a segment containing at least one binary one digit. Thus, the control digit indicating the presence of binary one information is added at the end of the count word from counter 537 indicating that the next group of eight bits will be the actual eight bit segment presently stored in shift register 501.

The count word in counter 537 has been shifted out of the counter between bit times of input register 501. This count must be added to the output data stream between bit times in order that no data information in the input register be lost by being shifted out without detection. After the binary one control bit from flip-flop 535 has been shifted through and out of counter 537 through AND gate 541 and OR gate 507, by means of the clock pulses at OR gate 559, the actual segment of information in the input register 501 must be shifted out into the video data stream. The output from AND gate 513 had set flip-flop 551 upon the detection of at least one binary one digit in the data segment in register 501. The output of flip-flop 551 now is at a binary one level which effectively enables AND gates 553 and 503. The actual clock pulse now appearing at the input of OR gate 559, through AND gate 553, is used as a clock shifting pulse to shift in the data information into the output buffer store from OR gate 507. Thus, as the next eight bit segment of information is shifted into register 501, the eight bit segment previously stored therein is shifted out through AND gate 503 and OR gate 507 to be stored in the buffer output store. For every segment containing at least one binary one digit, such data segment will immediately be shifted out to the buffer store without being counted at eight-stage counter 537.

Upon energization of the encoder, if the first segment of information shifted into the input register 501 contains at least one binary one digit, the situation arises of inserting the control digit signifying the existence of the binary one data in that segment. Since the eight-stage counter 537 had not previously counted any all binary zero groups, the output of each stage would be at the binary zero level. In this instance, therefore, AND gate 543 would have as its output a binary one level which is coupled to the input of AND gate 555. AND gate 513 noting the existence of at least one binary one digit in the first data segment, would also have as its output a binary one level. With both inputs at a binary one level, AND gate 555 will also have at its output a binary one level to the input of OR gate 507 and the input of one-shot 557. The output from the one-shot 557 is a pulse of one-quarter clock duration. This pulse, passing through OR gate 559, is passed to the buffer store to act as a clock pulse to shift in the control bit through OR gate 507. Thus, the control signal for the first eight bit segment of information at the input register is inserted in the video train in the proper position before the data information as it is shifted out of the input register 501.

If the encoder is used with a facsimile scanner, a signal indicating the end of a line could be used as the other input to flip-flop 575 indicating the end of the data for one scan. Such signal would reset flip-flop 575, thus disabling the rest of the circuit by means of the resetting of flip-flop 579 through AND gate 578. When such a fac simile scanner is utilized, the storage capacity of counter-shift register 537 can be made large enough to allow for a count of possible numbers of groups comprising an entire line of scanned information. However, as the encoder can be used with an endless train of video information, as from a computer or the like, the counter 537 may not be of large enough capacity to count the entire length of binary zero information that may appear in the information wave train. In this instance, therefore, provisions are made to shift out the information in the counter 537 between bit times so as not to lose any count information and to start the count again before the next group is to be detected.

When counter 537 has reached its maximum count, therefore, AND gate 545 will note the existence of all binary one levels as the output from the stages of counter-shift register 537. The binary one output from the AND gate 545, through OR gate 547, will set flip-flop 549. The output from the flip-flop 549 at the binary one level is an input to OR gate 519 and AND gate 531. By means of OR gate 519, flip-flop 521 is set and through AND gate 523 the ten times clock signal appears as the input to the four-stage counter 525. Also, the output from the AND gate 523 appears as an input to the flip-flop 535 as the shift signal, and as an input to OR gate 559. Thus, within one bit time, the contents of the eight-stage counter 537 is passed out the OR gate 507 from AND gate 541 at the ten times clock rate.

As was hereinbefore set forth, when the counter 537 is shifted out of its information, a binary one digit is inserted into the video stream. However, in this instance, if the information input to input register 501 still comprises segments of binary zero segments, then such binary one digit is not to be inserted into the video stream. Thus, AND gate 529 detects a count of nine and AND gate 527 detects a count of ten from counter 525. If the counter 537 has counted all the segments with binary zero information to the limit of the counter, then it is desired to have flip-flop 535 enter into the video stream a characterizing binary one digit indicating that the next segment contains binary one information. Therefore, the output from AND gate 527 through OR gate 533 resets flip-flop 521 to effectively disable AND gate 523. Thus, the entire contents of the ten stage shift-register-counter 537 is shifted into the output buffer store within one clock bit time. If, however, more segments with binary zero information are detected past the count capacity of counter 537, then the count of nine detected by AND gate 529 is utilized through AND gates 531 and OR gate 533 to reset flip-flop 521. In this manner, nine stages of the counter-shift register are transferred without the control bit from flip-flop 535. Thus, the counter 537 can continue counting the segments with binary zero information without interruption.

Figure 6:
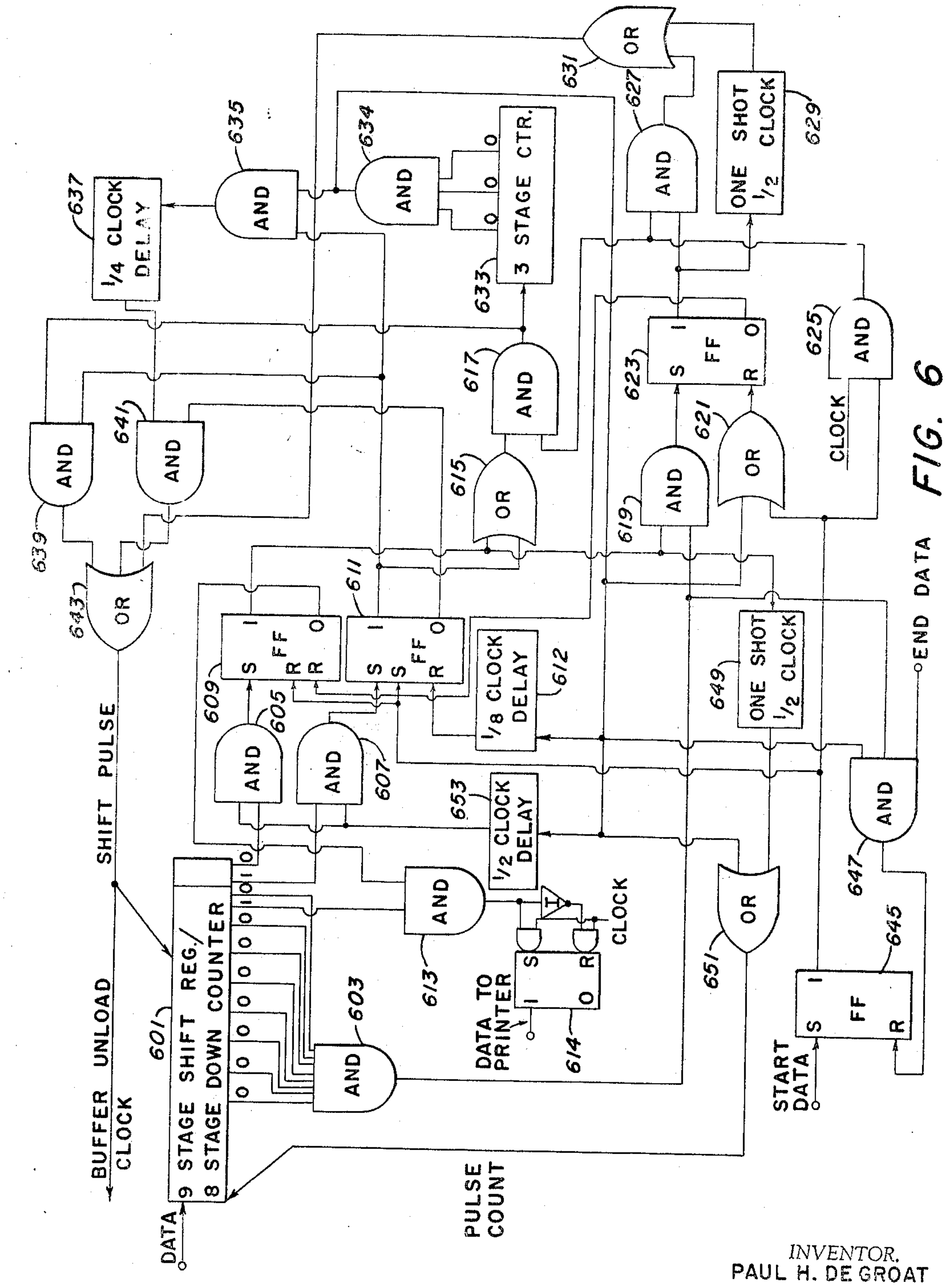
FIG. 6 is a detailed illustration of the binary decoder compatible with the binary encoder in FIG. 5 and in accordance with the principles of the present invention.

Referring now to FIG. 6, there is shown a decoder that is compatible with the encoder as shown and described in FIG. 5. At the start of the information transmission to the decoder, a start data signal will be applied to the set terminal of flip-flop 645 so as to enable the separate components to receive the input information. If the information waveform is from the output from a computer, the start data signal would indicate the beginning of the transmission. If a facsimile scanner was used at the transmitter, the start data signal could be the signal indicating the start of the scan and subsequent sync words indicating the beginning and end of the scanned lines. The start data signal at flip-flop 645 sets flip-flop 611 and, through OR gate 621, resets flip-flop 623, and through AND gate 625, applies the clock pulse frequency to the inputs of AND gate 617 and AND gate 627. The clock frequency is supplied in a similar manner as that present at the input to three-stage counter 569 in FIG. 5.

Upon initiation of the start data signal at flip-flop 645, a binary one level will appear at the set output thereof. With this signal setting flip-flop 611, a binary one level will appear on the set output of the flip-flop 611. This binary one level output appears as an input to AND gates 639 and 635, and OR gate 615. The binary one level is transferred to the output of OR gate 615 and with the clock frequency appearing at the other input to AND gate 617, causes the clock pulse frequency to appear at the output of the AND gate 617. This output is coupled to the input of three-stage counter 633 and the other input of AND gate 639. By the existence of the binary one level at one input to AND gate 639 and the clock frequency at the other input, the clock frequency is transferred through OR gate 643 to unload the data information from the input buffer unit and, at the same time, shift the information into the input shift register-counter 601. Thus, at clock times, the information is shifted into the input register 601 to occupy the nine positions in the register. As soon as all of the stages of the shift register are occupied by the control bit of a segment and the eight data bits thereof, the decoder will make a determination of the contents of the segment.

As the input register 601 was being shifted through with data information, the three-stage counter 633 was counting at the same clock time up to its count of eight. When the count reaches eight, AND gate 634 will be enabled and the output at the binary one level. This level is applied to the input of AND gate 635, the input to OR gate 621, after a one-eighth clock delay at 612 to the reset terminal of flip-flop 611, the input of AND gate 647, the input of OR gate 651, and after a one-half clock delay at 653, is applied to the inputs of AND gates 605 and 607. Tracing through the sequence of events, the binary one level from AND gate 634 resets flip-flop 611. By this reset action, AND gate 639 is effectively disabled while AND gate 641 is now effectively enabled. By the reset of flip-flop 611, AND gate 635 is also effectively disabled. At this point, therefore, no further information is being shifted into the shift register 601. After a one-half clock delay at delay 653, the binary one level output from AND gate 634 is applied to the input of AND gates 605 and 607. If, for example, the first binary digit in the input shift register 601 was a binary zero digit indicating that the binary information in the other eight stages of the shift register is the count of the number of consecutive groups of all binary zero information in the wave train, AND gate 605 would have as its output a binary one level which would set flip-flop 609. As the reset output of flip-flop 609 is connected as an input to AND gate 613, such AND gate is effectively disabled allowing only a binary zero level to appear at its output.

Thus, as the three-stage counter 633 counts to eight, such count appears at OR gate 651, through AND gate 634 as a count pulse to input shift register-counter 601. This count pulse effectively counts down the count stored in the counter-shift register 601. Therefore, every eight pulses from three-stage, counter 633 will cause eight binary zero digits to be placed in the output data stream to the printer through flip-flop 614. When the counter-shift register 601 has been counted down the required number of stored counts, the outputs from the separate stages will be at the binary zero level. AND gate 603 detects this condition and transfers a binary one level as its output to the input of AND gate 619. With AND gate 619 already enabled, flip-flop 623 is switched to the set state. The set output of flip-flop 623 is now at the binary one level and the front edge of this binary one signal will energize one-shot 629, and with a pulse of one-half clock duration will, through OR gates 631 and 643, shift in the next stored binary signal from the input buffer storage. AND gate 627 has the same output from flip-flop 623 and transfers the clock frequency through AND gate 625 and AND gate 627 through OR gates 631 and 643 to transfer in the rest of the binary information to refill the input counter-shift register 601.

If the first binary digit in the next stored segment of information is a binary one digit, there is indicated that the eight stored binary digits are the actual binary digits comprising a group in the information waveform. AND gate 605 is now disabled and AND gate 607 enabled such that flip-flop 611 is now put in the set condition. The binary one level output from the set terminal of flip-flop 611 through OR gate 615, enables AND gate 617. The output from AND gate 617 is a clock signal which appears at the input of three-stage counter 633 and the other input to AND gate 639. Such clock pulse is transferred through OR gate 643 to unload the rest of the information from the buffer storage, at the same time shifting out the already stored information in the shift register 601. Inasmuch as AND gate 605 is effectively disabled, flip-flop 609 is now in the reset condition; thus, the output reset terminal of the flip-flop is at a binary one level to effectively enable AND gate 613. Thus, as the input information is shifted into the buffer store by means of the clock shift pulse on the output line from OR gate 643, the contents of shift register 601 appears serially at the input to AND gate 613, which is effectively transferred through flip-flop 614 to the printer for the output printing of the information.

As the information in shift register 601 is being transferred out through AND gate 613 and flip-flop 614, the three-stage counter 633 has been again counting to its capacity of eight. When the count reaches eight, the output of flip-flop 611, being in the binary one condition, AND gate 635 is effectively enabled and through a one-quarter clock delay 637 is an input to AND gate 641. Before the one-quarter clock delay, however, the output of AND gate 634 had effectively reset flip-flop 611 so that its reset output terminal now is a binary one level signal to the input of AND gate 641. Through OR gate 643 is the shift pulse to shift the first pulse in the next segment which is the control bit indicating the status of the next eight bits in the segment into the counter-shift register 601. The clock frequency, through OR gate 643 shifts in the remaining eight bits of the segment into register 601 for the continuing operation to determine the contents of the segment from the presence of the one or zero indicator bits.

When the shift register-counter 601 indicates all zero information stored therein through AND gate 603, which is an input to AND gate 647, AND gate 634 transfers the count of three-stage counter 633 to the other input to AND gate 647, an end data signal can be applied to the gate 647 to disable the circuit. As stated previously, if the wave train is from a computer, the end data signal could be the signal indicating the end of the information waveform; while, if the information had been from a facsimile scanner, the end data signal could be the end of line signal to disable the circuit during the rescan or flyback time.

In the foregoing, there has been disclosed methods and apparatus for reducing the redundant information content in a digital data transmission system. While the embodiments have been described with the data information divided into segments of eight bits each, as has been hereinbefore discussed, such division is exemplary only as any division could be utilized according to the expected informational distribution of the waveform that would maximize the encoding process. Other logic components may be utilized for similar divided segments without departing from the principles of the present invention. In addition, logic AND and OR gate circuitry, together with flip-flop circuits, have been disclosed and described; however it is apparent that other logic circuitry could be designed by one skilled in the art to perform the same or equivalent functions. The count pulses are shown and described as being in the strict binary convention, but it is apparent that other representations may be used, as for example, the Gray scale or the like. Thus, while the present invention, as to its objects and advantages, as described herein, has been set forth in specific embodiments thereof, they are to be understood as illustrative only and not limiting. It is applicant's intention therefore, to be limited only as indicated by the scope of the appended claims.

What is claimed is:

1. The method of reduced redundancy encoding of information transmitted by binary electrical signals, comprising the steps of:
- analyzing successive like segments of said binary electrical signals for binary digits of a first and second binary level;
- detecting the presence of at least one binary digit of the first binary level in said successive like segments of said binary electrical signals;
- counting each successive like segment of said binary electrical signals detected with the presence of all binary digits of the second binary level;
- generating two binary characterizing digits of a first and second binary level;
- transmitting a binary characteristizing digit of said first binary level with the binary digits comprising the segments of said binary electrical signals detected with the presence of at least one binary digit of said first binary level; and
- further transmitting a binary characterizing digit of said second binary level with the count number of the successive like segments of said binary electrical signals detected with the presence of all binary digits of the second binary level.

2. In a graphic communication system wherein information is transmitted by binary electrical signals, the method of reduced redundancy encoding comprising the steps of:
- dividing said binary electrical signals into a plurality of elements;
- sequentially analyzing said elements comprising a predetermined number of binary digits of a first and second binary level;
- detecting the presence of at least one binary digit of a first binary level representative of data information;
- counting each successive element of said binary electrical signals detected with the presence of all binary digits of the second binary level representative of the redundant information therein;
- characterizing each said count number of successive elements with a first binary digit;
- further characterizing each of said elements detected with the presence of at least one binary digit of said first binary level with a second binary digit; and
- transmitting said elements with at least one of said first level binary digits and said count numbers with their respective binary characterizing digits.

3. The method as defined in claim 2 wherein said step of dividing includes:
- serially storing said binary signals and logically inspecting said elements for said data information.

4. The method as defined in claim 2 wherein said binary electrical signals are obtained by scanning a plurality of lines on a printed document according to a predetermined raster, and further including:
- interrupting the scan upon detection of said data information in an element; and
- slowing the scan for detection and transmission of the data binary digits within said element.

5. In a graphic communication system, the method of transmitting video signals comprising the steps of:
- scanning selective elemental areas of a plurality of lines on a document along a predetermined raster to form a binary data waveform representative of the information on said document;

dividing the data waveform into M segments of N binary digits each, wherein N is smaller than the longest group of consecutive binary zero digits representaitve of background information that can occur, M and N being integers;

sequentially analyzing said M segments for detecting the presence of at least a single binary one digit in the N binary digits comprising said segments;

counting each successive segment detected with all N binary digits of a second binary level representative of the background information on said document;

characterizing each said count signal with a first binary digit;

further characterizing each of said segments detected with the presence of at least a single binary one digit in the N binary digits comprising said segments; and transmitting said segments with said at least one binary one digit and said count signals with their respective binary characterizing digits.

6. In a graphic communication system, a binary encoder for reducing the redundancy in a binary signal waveform comprising:

storage means for storing at least one of a plurality of successive like portions of said binary signal waveform;

first gating means coupled to said storage means for detecting the presence of at least one binary digit of a first binary level in said successive portions of said binary signal waveform;

counter means coupled to said first gating means for counting each successive like portion of said binary signal waveform detected with the presence of all binary digits of a second binary level;

means for generating two binary characterizing digits of a first and second binary level;

second gating means responsive to said first gating means and said counter means for transmitting a first polarity binary characterizing digit with the count number in said counter means of successive like portions detected with the presence of all binary digits of a second binary level; and third gating means responsive to said first gating means for transmitting the binary characterizing digits of said second polarity with the binary digits in said storage means comprising the portions of said binary signal waveform detected with the presence of at least one binary digit of said first binary level.

7. In a graphic communication system wherein information is transmitted by binary electrical signals, a reduced redundancy encoder comprising:

shift register means with a predetermined number of binary digit storage positions to store successive like portions of said binary electrical signals;

first gating means coupled to said shift register means to monitor the polarity of the binary electrical signals being shifted therethrough;

second gating means coupled to said first gating means for detecting the presence of at least one binary digit of a first binary level in the binary electrical signals in said shift register;

third gating means coupled to said first gating means for detecting the presence of all binary digits of a second binary level in the binary electrical signals in said shift register;

means coupled to said third gating means for counting the number of successive like portions of the binary electrical signals shifted through said shift register detected with all second level binary digits;

means for generating two binary characterizing digits of a first and second polarity;

fourth gating means for transferring the predetermined number of binary digits in said shift register with a binary characterizing digit of said first polarity upon detection of at least one binary digit of the first binary level therein; and fifth gating means for transferring the stored count number with a binary characterizing digit of said second polarity representative of the number of successive like portions of the binary electrical signals shifted through said shift register with all second level binary digits.

8. The apparatus as defined in claim 7 further including:

first clock generating means for generating timing pulses at the input information bit rate;

second clock generating means for generating timing pulses at a rate substantially greater than the information bit rate;

buffer storage means for receiving the output information signals from said fourth and fifth gating means;

sixth gating means responsive to said timing pulses from said first and second clock generating means for enabling said buffer storage means at the rate of the respective timing pulses;

said timing pulses from said first clock generating means utilized to shift the binary digits in said shift register means and said associated characterizing digit into said buffer storage means; and said timing pulses from said second clock generating means utilized to shift the stored count number and said associated characterizing digit into said buffer storage means between the input information bit times.

9. In a graphic communication system, a binary decoder for reconstructing a transmitted binary waveform of reduced redundancy comprising:

shift register-counter means with a predetermined number of binary digit storage positions to store successive portions of said binary waveform, said binary waveform portions comprising information digits and a binary characterizing digit;

first gating means coupled to said shift register means to monitor the polarity of the information digits being shifted therethrough;

second and third gating means coupled to said shift register means to monitor the polarity of the binary characterizing digits on each of said successive portions of the binary waveform, wherein a binary characterizing digit of a first polarity is associated with a binary count number representative of successive portions of the reconstructed waveform containing all binary digits of a first binary level, and wherein a binary characterizing digit of a second polarity is associated with the binary digits of a portion containing at least one binary digit of a second binary level, respectively;

first switching means responsive to said second gating means to disable said first gating means to allow a predetermined number of binary digits of a first binary level to be transferred for each count representative of binary waveform portions of all binary digits of a first binary level; and second switching means responsive to said third gating means to enable said first gating means for allowing the predetermined number of binary digits stored in said shift register to be transferred.

10. The apparatus as defined in claim 9 further including:

means for counting to the number equivalent to the number of binary digit storage positions in said shift register means, said counter means coupled to said shift register to count down said count number stored therein upon detection of said characterizing digit of said first polarity at said second gating means;

buffer storage means for transferring said transmitted binary waveform into said shift register;

clock generating means for generating timing pulses at the input information bit rate; and fourth gating means responsive to said first and second switching means and said timing pulses for shifting the binary information in said buffer store into said shift register.

References Cited

UNITED STATES PATENTS

| | | | |
|---|---|---|---|
| 2,922,840 | 1/1960 | Lally | 178—6.6 |
| 2,978,535 | 4/1961 | Brown | 178—6 |

ROBERT L. GRIFFIN, Primary Examiner

RICHARD K. ECKERT, Jr., Assistant Examiner

U.S. Cl. X.R.

325—38